Jan. 2, 1923.

C. P. DUBBS.
APPARATUS FOR TREATING PETROLEUM AND OTHER HYDROCARBONS.
ORIGINAL FILED NOV. 27, 1916.

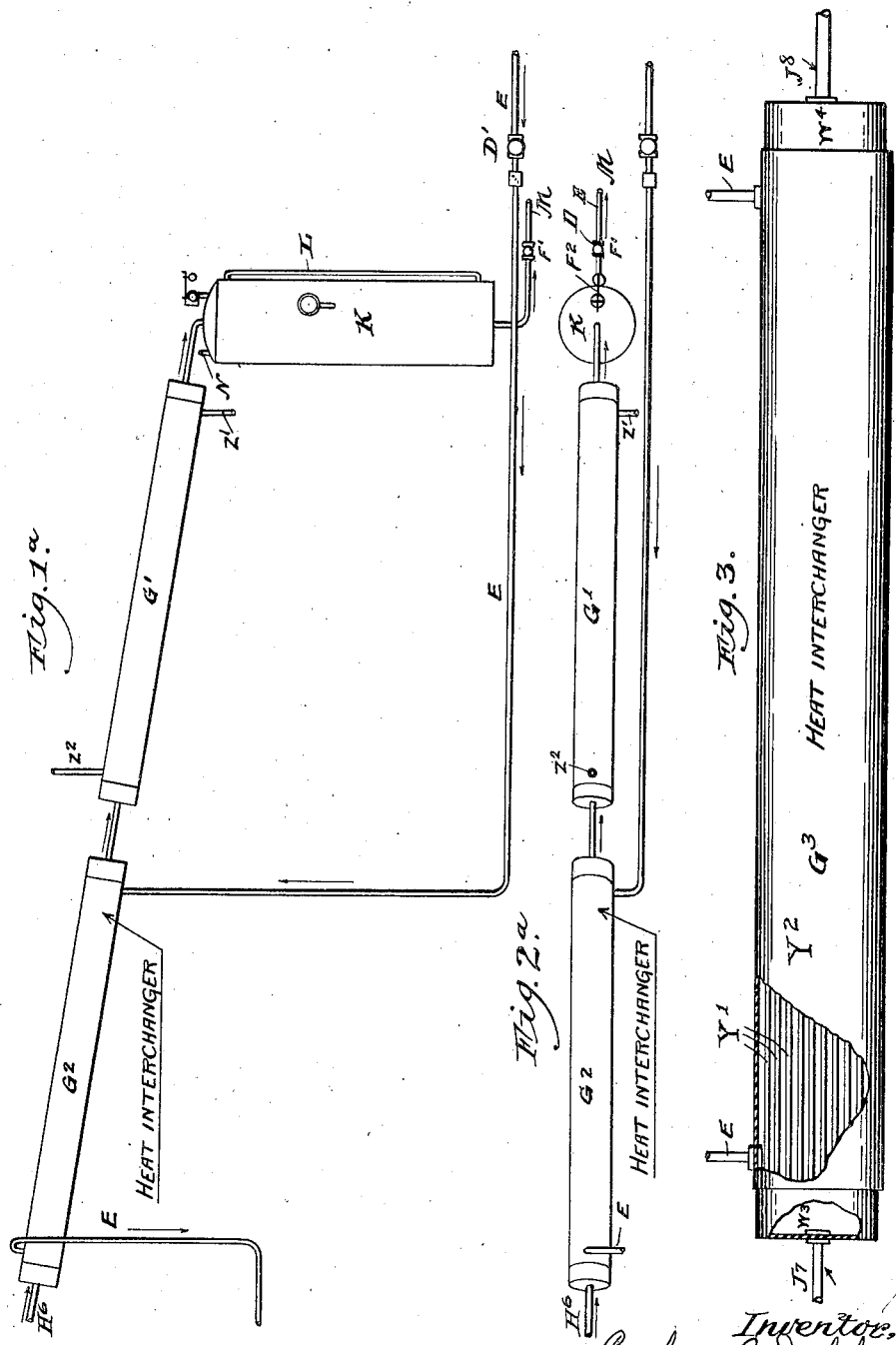

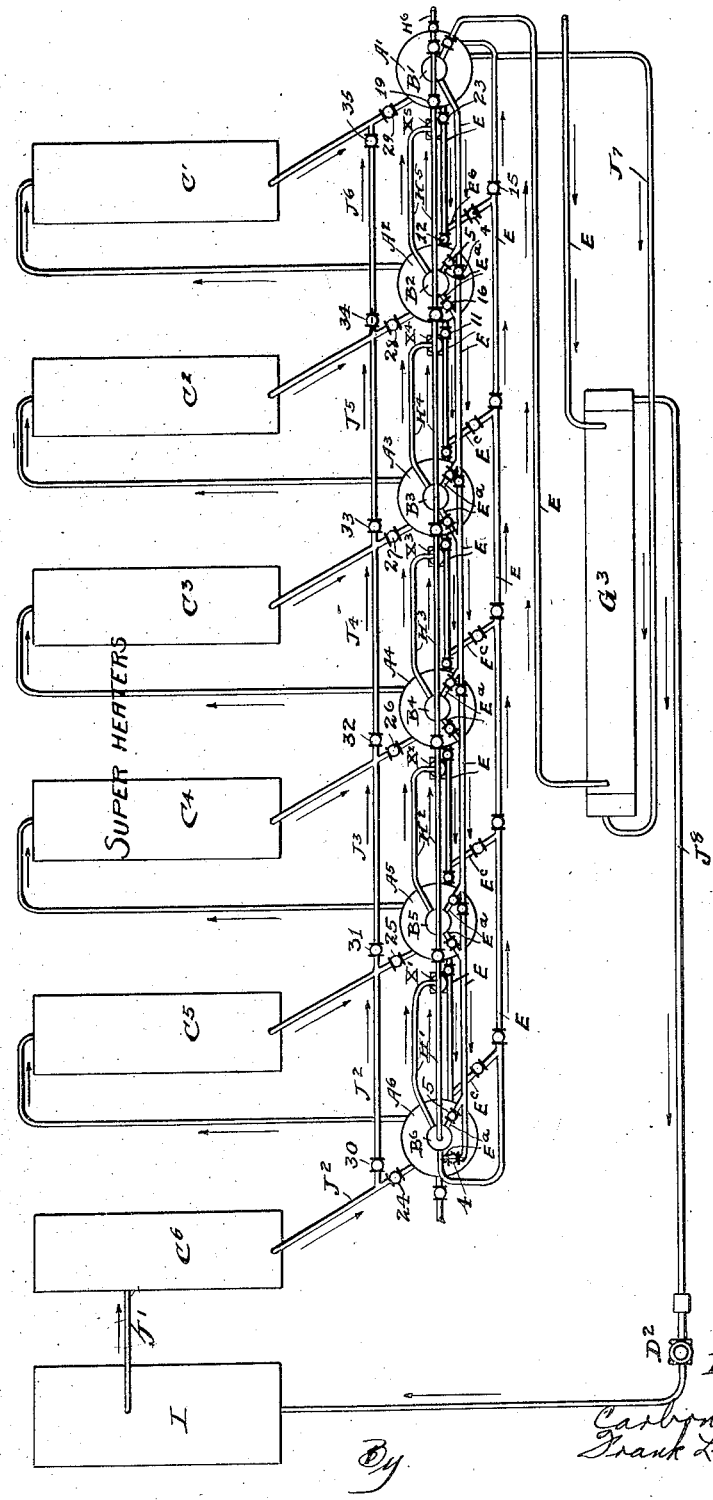

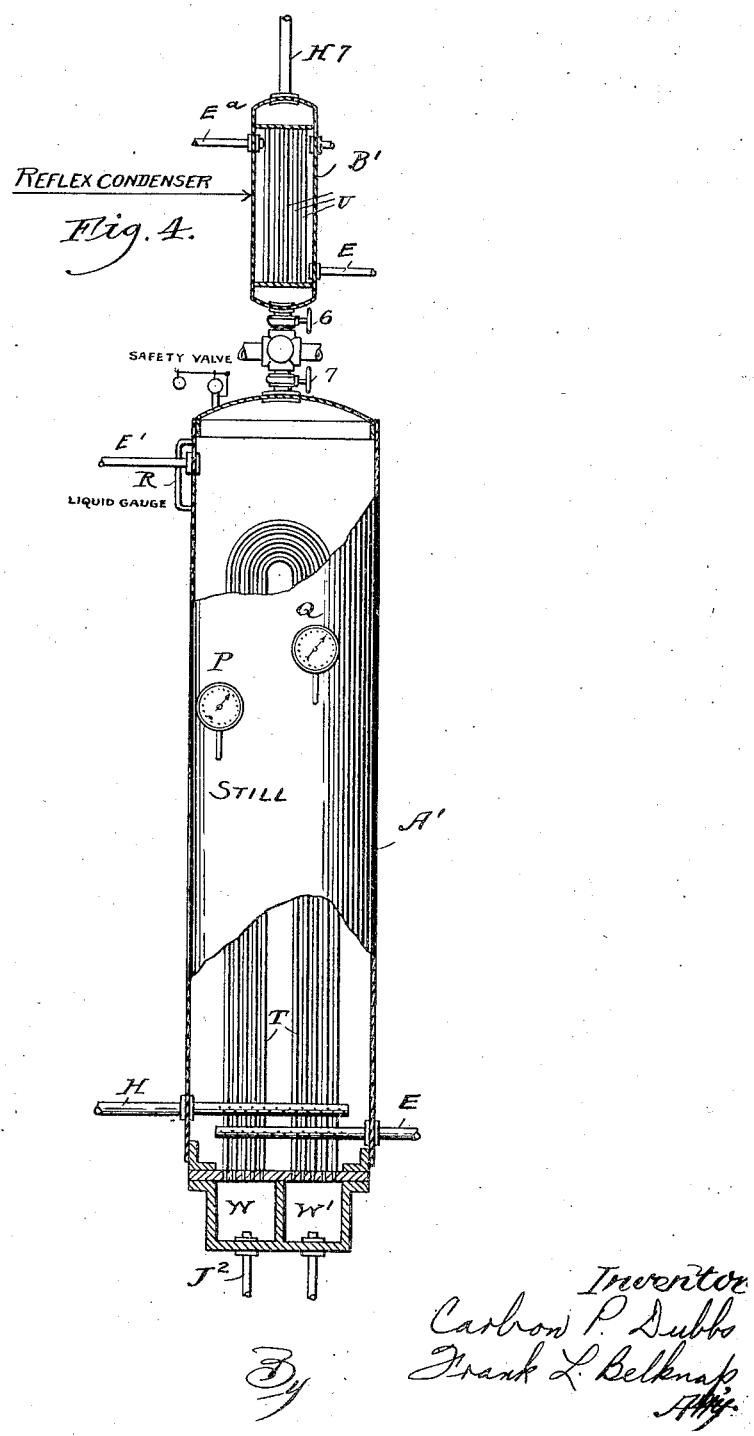

Patented Jan. 2, 1923.

1,440,772

UNITED STATES PATENT OFFICE.

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA.

APPARATUS FOR TREATING PETROLEUM AND OTHER HYDROCARBONS.

Original application filed November 27, 1916, Serial No. 133,527. Divided and this application filed June 23, 1917. Serial No. 176,588.

*To all whom it may concern:*

Be it known that I, CARBON P. DUBBS, a citizen of the United States, residing in the city of Wilmette, county of Cook, and State of Illinois, have invented certain new and useful Improvements in Apparatus for Treating Petroleum and Other Hydrocarbons, of which the following is a specification.

The application is a divisional application of an original application filed by me, November 27, 1916, Serial No. 133,527 which has matured into Letters Patent No. 1,231,509, issued June 26th, 1917.

This invention relates to an apparatus for treating petroleum and other hydrocarbons to produce hydrocarbon products having lower boiling points than those treated.

The invention contemplates an apparatus whereby crude petroleum, petroleum distillates, petroleum residuum, or other like material can be placed in the apparatus and a gasoline-like product produced. Other objects of the invention are to provide apparatus in which the oil being treated is fractionally distilled and subjected to a cracking, breaking up, and polymerization process to convert heavier hydrocarbons or like substances into lighter, and then such changed or converted oil fractionally distilled as one uninterrupted process, and during such process, passing the vapors and gases generated back through the liquid body and incidentally thereby reducing the amount of incondensable gases and unsaturated hydrocarbons; to provide an apparatus whereby more or less of the hydrocarbon treated can be converted into the product desired; to provide an apparatus wherein the heat units are utilized with the greatest efficiency; to provide an apparatus in which a series of retorts and chambers are employed and in which the hydrocarbons treated are subjected to progressively increasing temperatures; to provide a construction in which the vapor and gases are subjected to progressively decreasing temperatures, the vapors and gases being preferably allowed to percolate up through the various chambers and retorts, advancing from those having the higher temperatures to those having the lower temperatures; to provide an apparatus wherein the vapors, whether the condensable vapors or the incondensable gases, and the liquid are caused to contact with each other in the zones of reaction.

The invention also resides in such features of construction, as will more fully be hereinafter described.

In the drawings:

Figs. 1 and $1^a$ are side elevations of an apparatus by which my method can be carried out.

Figs. 2 and $2^a$ are top plan views of the constructions shown in Fig. 1.

Fig. 3 is an enlarged side elevation, partly in section, of one of the heat interchangers.

Fig. 4 is an enlarged side elevational view, partly in section, of one of the stills.

Describing in detail the method with reference to the particular apparatus shown in the drawings, $A^1$, $A^2$, $A^3$, $A^4$, $A^5$ and $A^6$, designate the retorts or stills in which the petroleum or other hydrocarbons to be treated are subjected to the action of heat, it being understood that any number of retorts may be used. $G^2$ designates a heat interchanger, by which more or less of the heat contained in the final vapors and gas distilled off are transmitted to the incoming supply of raw material.

In practice, the oil is pumped or fed through the line E, so as to go through the heat interchanger $G^2$, then out through the line E, to the heat interchanger $G^3$, from the latter heat interchanger, the oil passes through the lines E to a series of reflux condensers marked $B^1$, $B^2$, $B^3$, $B^4$, $B^5$, and $B^6$, then through the pipe E into bottom of retort $A^1$, the flow of the incoming charge of raw material being shown by the arrows positioned adjacent the pipe E or any other combination of the apparatus may be used that will accomplish the desired results, for instance, the raw material may be pumped directly into the heat interchanger $G^3$ and from there go directly into the bottom of any of the retorts.

The raw material in the retort $A^1$, is heated to drive off the vapors, the temperature depending, to a considerable extent, upon what product is desired. The vapors and gases generated in the retort $A^1$, pass up through the reflux condenser $B^1$, in which the heaviest vapors condense and return to the retort while the uncondensed vapors and gases pass through the pressure regulated valve $F^2$, and through the line $H^6$, into the heat interchanger $G^2$, and from there through the water condenser $G^1$, into a receiving tank K, sufficient pressure being maintained on this tank to force the distillate to any desired point and the gases generated to any desired point.

The residuum remaining in retort $A^1$, overflows through pipe $E^1$, and enters the bottom of still $A^2$, which retort is maintained at a higher heat, and the vapors and gases which are generated at a higher heat in this retort pass up through the reflux condenser $B^2$, the heavier vapors being condensed and returned to the retort $A^2$, while the lighter vapors and gases pass through vapor line $H^5$ and pump $X^5$, and discharge through pipe H, into the bottom of the retort $A^1$, along with any condensed vapors, and percolate up through the oil contained in retort $A^1$. The function of the pumps shown at $X^1$, $X^2$, $X^3$, $X^4$, and $X^5$, being to force the vapors along with any condensed portion of the vapors and incondensable gases, down through pipe H and out through the perforations in this pipe, into the bottom of the retorts and thus facilitate the operation, these pumps may be of the spiral or rotary type of standard design and be operated by belt or by any of the other well known standard methods. The pumps themselves do not necessarily create a pressure on the apparatus, but are primarily for overcoming the pressure exerted against the vapors in pipe H created by the height of the column of liquid contained in the retorts.

The residuum remaining in the retort $A^2$ overflows through pipe $E^1$ into retort $A^3$ at the bottom, retort $A^3$ being maintained at a higher heat than the preceding retort $A^2$. The vapors which are generated at the higher heat in retort $A^3$, along with the gases, then pass up through reflux condenser $B^3$, the heavier vapors being condensed and return to the retort $A^3$, while the lighter vapors and gases pass through the line $H^4$ and pump $X^4$ to the bottom of retort $A^2$ and are discharged along with any condensed vapors, through pipe H in the same manner as described with the preceding retort.

The residuum remaining in retort $A^3$ overflows through pipe $E^1$ into retort $A^4$, the heat in this retort being higher than in the preceding retort. The same cycle of operation is then carried out for each retort of the series so that by the time the residuum reaches the last retort of the series, it will have been subjected to progressively increasing temperatures until the desired amount has been converted into product desired. The residuum remaining in retort $A^6$ is drawn off continuously or intermittently through the valve $F^4$ through pipe $E^2$ or through valve F F shown on side of retort near the top, such residuum being passed through heat interchangers similar to $G^2$ and thus preheating the incoming supply of raw material; such residuum is then rerun through the apparatus either with or without any previous treatment, or with or without being mixed with other material.

It will be noticed that the raw material in passing through the apparatus forms a pool in each retort and is subjected in the various retorts to a progressively increasing temperature while the vapors and gases given off have not only been made to percolate up through the liquid and caused to mix with the liquid in the zones of reaction; but have also been caused to travel in the reverse direction from the liquid so as to be subjected to progressively decreasing temperatures. This arrangement permits the vapors and gases to be subjected to comparatively high and low temperatures without excessive pressure, while the vapors in their final form, as they pass to the condenser, have been scrubbed through the liquid and their temperatures greatly reduced, so that as they pass from the retort $A^1$ to the condenser, they are at a relatively low temperature compared with that to which they may have been subjected in the farthest retort.

This novel apparatus will tend to prevent any heavy vapors, or vapors which have not been sufficiently treated, from passing to the condenser, since the stepdown in temperature, as the vapors and gases pass through the various retorts toward the condenser, will tend to condense any heavy vapors and cause them to be carried back with the residuum and again subjected to the higher temperature. Another material advantage of this apparatus lies in the fact that the vapors and gases being stepped down in temperature by percolating through the liquid in the successive retorts having lower temperatures, the heat units which are extracted in cooling the vapors and gases are transmitted to the liquid which is traveling in the reverse direction and is stepping up in temperature.

While any desired method of heating the retorts may be employed such as the usual furnace or internal electric, I have in the drawing shown the retorts as designed to be heated by steam. In detail, the steam heating arrangement comprises the boiler I, and a plurality of superheaters $C^1$, $C^2$, $C^3$, $C^4$, $C^5$ and $C^6$. The purpose of these superheaters is to permit the temperature in the various retorts being independently regulated and maintained at the progressively higher temperature for the various retorts. In operation, the steam is generated in the boiler I, and passes through the steam line $J^1$, into the superheater $C^6$ and from there passed through pipe $J^2$ to the heating coils T, which are located in each of the retorts. The steam is discharged through the pipe $J^2$ into the inlet manifold header W and then passes through the coils T to the outlet manifold W¹, from which it passes to the superheater C⁵. Here the steam may be reheated to secure any predetermined temperature for the retort A⁵. Should the heat units given up by the vapors and gases percolating through any retort be sufficient to maintain the desired temperature in that particular retort, the steam can be by-passed entirely from such retorts, or partially by-passed by means of partly or wholly closing valves marked 24, 25, 26, 27, 28 and 29, while partly or wholly opening valves 31, 32, 33, 34 and 35. The purpose of the arrangement is to permit the independent regulation of the temperature of any one or all of the retorts, while utilizing to the highest degree, the heat units given up by the vapors and gases being cooled from heating the liquid in the various retorts.

As has been pointed out above, the apparatus is so constructed that the heat applied to any one of the stills or retorts A¹ to A⁶ inclusive, may be cut off from said retort by the valves 24 to 29 inclusive, and 31 to 35 inclusive, in which event the oil in the retorts where no heat is applied will become sufficiently heated by heat units taken up from vapors passing from one or more of the other retorts or stills, or if desirable, the pools of oil in certain of the retorts may be slightly heated by steam or other means in addition to the heat imparted thereto by the vapors bubbling through the oil pools. Assuming that only one of the retorts is being heated to a high temperature, and that this retort is A⁶, then the oil introduced by the pipe E passes into the stills or chambers A¹ to A⁵ inclusive, forming oil bodies or pools therein, and then to the retort A⁶. The operation is of course continuous and vapors generated from the retort A⁶ pass out through either the reflux condenser B⁶ or the vapor line H^{y1} into the chamber A⁵ containing a pool of oil, and said vapors pass through said pool of oil imparting their heat units thereto, the oil causing a condensation of the heavy constituents while the lighter vapors pass on into the successive chambers A⁴ to A¹ inclusive, which contain pools of oil of progressively decreasing temperatures. The vapors finally emerging from the chamber A¹ are of course thoroughly cleansed and the heavy constituents have been condensed due to the action of the body of oil so that the vapors discharged when later condensed in a water condenser or the like provide a high grade gasoline. Naturally, the vapors in passing through the pools of oil distribute some of their heat to the oil bodies, but as I have pointed out above, if additional heat is necessary the chambers or retorts can be independently heated by the means herein disclosed. In addition to using only one retort for the positive distillation of the oil under pressure two or more retorts could be used or even all of the retorts. For instance, retorts A⁵ and A⁶ could be employed for generated vapors which would then pass successively through the pools of heated oil in retorts A¹ to A⁴, and it is apparent that the vapors generated pass in a direction opposite to the flow of the oil on its way to the succeeding retorts, and that the physical contact of the vapors with the oil causes a condensation of the heavier vaporized substances while the lighter gasoline like bodies escape as vapors after being purified on their way to the water condenser. As I have clearly pointed out in preceding portions of this specification, my invention contemplates the application of heat to all of the retorts, or the disconnecting of the heat to any number of said retorts in instances where the vapors impart sufficient heat units to the oil in such retorts.

After the steam has been utilized for heating the various retorts, its heat units are further conserved by transferring them into the incoming raw material by means of one or more heat interchangers G³. The operation of this heat interchanger G³ is as follows: Steam is admitted through the pipe J⁷ into the inlet manifold header W³ from which it passes through the pipes Y¹ to the outlet header W⁴, from which it is returned through the pipe J⁸ to the boiler I.

In addition to the heat interchanger G³, I preferably employ the heat interchanger G² in which the heat units of the vapor and gases as finally discharged from the retort A¹, are transferred to the incoming raw material. If a further cooling of the resultant vapors is necessary, a water cooler having a water inlet Z¹ and a water outlet Z² is positioned around the portion of the pipe H⁶, leading to the distillate and gas receiving tank K, from which the resultant product in both liquid and gaseous form are received and discharged to their respective storages.

The reflux condensers are utilized as heat interchangers in that the oil coming from the pipe E is discharged into chambers surrounding the pipes U, Fig. 4 of the reflux condenser and then pass out through the pipe E^a near the upper end. Thus the heat units extracted from the vapors are transferred to incoming raw material. The apparatus, however, is preferably arranged so any one or multiple of these reflux condensers can be used or by-passed. Also the vapor lines are so arranged that the vapors and gases can be by-passed from any one or any multiple of the reflux condensers or retorts by means of lines H^{y1} to H^{y5}. Also for convenience, in repairing or for other purposes, the apparatus should preferably be so constructed that any of the retorts, heaters or condensers can be by-passed without in any way affecting the operation of the rest of the apparatus, suitable valves being provided. Any number of retorts, reflux condensers, condensers, heat interchangers, etc. can be employed.

Valves 3, 5, 6, 7, 9, 11, 13, 15, 16, 28, 18, 20 and 23 are opened, while valves 2, 4, 8, 10, 12, 14, 19, 21, 22 and 34 are closed. The body of oil being treated passes as follows: The oil enters reflux condenser B', passes around the vapor pipes U in same, then out through pipe E$^a$ and then through the succeeding reflux condensers in like manner, and from last reflux condenser, the oil enters retort A' through perforated pipe in bottom of the retort connected to pipe E, overflows through pipe E' to perforated pipe in retort A$^2$ and so on through each succeeding retort, and is drawn off from last retort through valve F$^4$. If it is desired that the oil do not pass through any reflux condenser, to prevent the oil getting too hot, as for example, reflux condenser B$^2$, valves 5 and 16 would be closed while valve 4 would be open. If it is desired that the oil flowing from one retort to the next succeeding retort enter the top instead of the bottom of the succeeding retort, as for example, enter the top of retort A$^2$, then valve 13 would be closed and valves 11 and 12 opened and the oil would then flow into and out of the top of retort.

The vapors generated in the different retorts normally are passed up through the reflux condensers and then forced down and into bottom of the next retort through perforated pipe H, excepting retort marked A', the vapors from which are carried to condensers and then condensed and collected. Any of the reflux condensers may be bypassed, as for example, reflux condenser B$^2$, by closing valves 6, 3 and 20 and opening valves 7 and 21. It will also be noted that the supply line E is provided with a valve D' and that the apparatus has a pressure gauge P and pyrometer Q of standard make.

The passage of the vapors from one of the retorts may be controlled so that said vapors pass successively through all of the retorts prior to discharge from the initial stage retort A' into the dephlegmator B', and that these vapors need not necessarily go through the various reflux condensers B$^2$ to B$^6$ inclusive during their travel through the series of connected retorts. Thus, for instance, the vapors generated in the last retort A$^6$ pass up through the pipe 1', the valve 1$^2$ being closed and the valve 2' being open, the valve 3' being likewise open, and the valves 4' and 4$^2$ closed, causing the vapors to pass through the pump X' and the pipe X$^a$ into the preceding retort A$^5$ from which the vapors introduced to this retort after a slight condensation of the heavier constituents thereof and the vapors produced in the retort A$^5$ pass through the pipe controlled by the open valve 5' are prevented from entering the reflux condenser B$^5$ by the valve 6', pass through the pipe HY$^2$ through the open valve 7', down through the pipe Y$^a$ and into the retort A$^4$, the valves 8' and 8$^2$ being closed. From the retort A$^4$ the vapors pass through the valve controlled pipe 10' the valve 9' being closed so that these vapors do not enter the dephlegmator B$^4$ passing, however, through the pipe HY$^3$ through the open valve 12' down through the pipe Z$^a$ into the retort A$^3$, it being apparent that the valves 11' and 12$^2$ are closed. The vapors from the retort A$^3$ can then be passed through the pipe controlled by the valve 14', the valve 13' being closed, through the pipe HY$^4$, the valve 10 being open, and the valves 8 and 9 closed down through the pump X$^4$ and into the retort A$^2$, from which retort all the vapors thus accumulating in the successive retorts A$^3$, A$^4$, A$^5$ and A$^6$ pass through the pipe controlled by the valve 7, the valve 6 being closed, through the pipe HY$^5$, the valve 21 being open and the valves 20 and 22 closed, thence from the pump X$^5$ into the retort A'. From this retort by opening the valves 20$^b$ and 21$^a$ all the vapors are subjected to their initial reflux treatment by passage through the reflux condenser B', the condensate returning to the first or initial stage retort A' for passage through the successive retort to undergo retreatment. From the reflux condenser B' the vapors pass out in the heretofore described manner through the pipe H$^7$ and the pipe H$^6$ for condensation and collection. It is therefore apparent that any or all of the reflux condensers can be cut out so that the vapors generated in one retort are not necessarily subjected to a reflux treatment before these vapors are introduced to a preceding retort, although such a treatment may be given whenever desirable.

From the above description it will be apparent that the raw material is first preheated by the heat units extracted in cooling the heated vapors and gases, second, that the material treated is progressively subjected to increasing temperatures while maintaining any desired pressure on the vapors generated, and that the resultant vapors are caused to travel in the reverse direction, that is, through progressively decreasing temperatures, while caused to percolate up through the liquid so that the liquid, vapors and gases are present in the zones of reaction, and the vapors and gases progressively advanced towards the retort or through a portion of the apparatus having a lower temperature. The temperature to which the oil is heated may vary during the process from a minimum of 200 degs. F. to 500 degs. F. and from a maximum of 500 degs. F. to 2000 degs. F. The pressure may vary from a minimum of 50 pounds to the square inch to a maximum of 1000 pounds to the square inch.

While I have shown and described a particular apparatus for carrying out my method, the latter is not limited to use with the particular apparatus shown and described. Also various changes in the details of construction and connections and operations of the apparatus can be made within the scope of my invention.

I claim as my invention:

1. An apparatus for cracking oil under high pressure, comprising means for preliminarily heating the oil, a plurality of vertically disposed retorts receiving bulk supplies of heated oil and serially connected, means for heating each retort, means for feeding heated oil to one of said retorts to pass successively through the series thereof, means for passing vapors generated in one retort through other retorts, dephlegmating means, means for discharging vapors for reflux condensation and for returning oil constituents from the dephlegmating means for passage through the series of retorts for retreatment, means for condensing the vapors discharged from the dephlegmating means, and means for maintaining the oil during distillation under a super atmospheric vapor pressure.

2. An apparatus for cracking oil comprising a plurality of separate serially connected vertical retorts and means for heating each retort to a cracking temperature, means for feeding heated oil to one of the initial stage retorts to pass successively through subsequent retorts, dephlegmating means, means for passing the vapors generated in the different retorts through other retorts to a retort constituting a vapor receiving and discharging retort, means for discharging vapors from said vapor receiving and discharging retort to the dephlegmating means for subjecting them to their initial reflux treatment and for returning reflux condensate from the dephlegmating means for repassage through said series of retorts for retreatment, a condenser in communication with said dephlegmating means, and means for maintaining the oil during distillation under a super atmospheric vapor pressure.

3. An apparatus for cracking oil, comprising means for preliminarily heating oil, a plurality of separate serially connected vertical retorts, and means for heating each retort to a cracking temperature, means for feeding heated oil to one of the initial stage retorts to pass successively through the subsequent retorts, dephlegmating means, means for passing the vapors generated in different retorts through other retorts to a retort constituting a vapor receiving and discharging retort, means for discharging vapors from said vapor receiving retort and subjecting them to their initial reflux treatment, and for returning oil constituents from the dephlegmating means for repassage through said retorts for retreatment, a condenser in communication with said dephlegmating means, and means for maintaining the oil during distillation under a super atmospheric vapor pressure.

4. An apparatus for cracking oil, comprising a plurality of separate serially connected retorts, each adapted to receive bulk supplies of oil and means for heating each retort to a cracking temperature, means for feeding heated oil to one of the initial stage retorts to pass successively through the subsequent retorts, dephlegmating means, means for passing the vapors generated in the different retorts through other retorts to one retort constituting a receiving and discharging retort, means for subjecting the vapors from said discharging retort to their initial reflux treatment in a dephlegmator and for returning oil constituents from the dephlegmating means for repassage through the series of retorts for retreatment, a condenser in communication with said dephlegmating means, and means for maintaining the oil during distillation and condensation under a super atmospheric vapor pressure.

5. An apparatus for cracking hydrocarbon oils, comprising means for preliminarily heating the oil, a plurality of separate retorts each adapted to receive bulk supplies of oil, means for connecting said retorts in series, means for heating each retort, means for introducing heated oil to one of the initial stage retorts to pass successively through subsequent retorts, dephlegmating means, means for passing vapors generated in different retorts through other retorts of the series into a vapor receiving and discharging retort, means for discharging said vapors from said retort to the dephlegmating means and for returning oil constituents from the dephlegmating means for repassage through said retorts, a condenser in communication with said dephlegmating means for receiving uncondensed vapors, and means for maintaining the oil during distillation under a super atmospheric vapor pressure.

6. An apparatus for treating hydrocarbon oils, comprising means for preliminarily heating oil, a battery of retorts receiving bulk supplies and serially connected, means for heating said retorts, means for delivering preheated oil to one of the retorts to pass successively through said series of retorts, dephlegmating means, means for passing vapors generated in certain of the retorts successively through other retorts into a vapor collecting and discharging retort, means between the discharging retort and the dephlegmating means for the discharge of the vapors to be subjected to their initial reflux treatment and for returning reflux condensate from the dephlegmating means for repassage through said series of retorts for retreatment, a condenser in communication with said dephlegmating means, and means for maintaining the oil during distillation under a super atmospheric vapor pressure.

7. An apparatus for treating hydrocarbon oils, comprising means for preliminarily heating oil, a battery of separate serially connected retorts, each adapted to receive bulk supplies of oil means for heating each of said retorts, means for delivering the preheated oil to one of the retorts to pass successively through said series of retorts, dephlegmating means, means for passing vapors generated in the different retorts into one of said retorts from which the vapors are delivered to the dephlegmating means and for returning reflux condensate from the dephlegmating means for repassage through said series of retorts, a condenser in communication with said dephlegmator, and means for maintaining the oil during distillation under a super atmospheric pressure of gases generated from the oil under treatment.

8. An apparatus for treating hydrocarbon oils, comprising means for preliminarily heating oil without causing a substantial vaporization thereof, a plurality of separate retorts serially connected, each adapted to receive bulk supplies of oil heating means for each of said retorts, means for transferring the preheated oil to one of said retorts to pass successively through said serially connected retorts where vaporization occurs, dephlegmating means, means for passing vapors produced in certain of said retorts through successive retorts to one retort to be delivered from said retort to the dephlegmating means and for returning oil constituents from the dephlegmating means for repassage through the series of retorts, a condenser communicating with the dephlegmator, and means for maintaining the entire system under a super atmospheric vapor pressure produced from the oil under treatment.

9. An apparatus for cracking hydrocarbon oils, comprising means for preliminarily heating the oil, a plurality of separate retorts serially connected, each adapted to receive bulk supplies of oil means for heating each of said retorts, means for feeding the preheated oil to an initial storage retort to pass in succession through the series of retorts, whereby a quantity of oil is converted into vapors in each succeeding retort, means for passing vapors generated in certain retorts through other retorts into a vapor receiving and discharging retort, a dephlegmator, means for discharging vapors from said vapor receiving and discharging retort to the dephlegmator and for returning oil constituents from the dephlegmator for repassage through the said series of retorts, a condenser in communication with the dephlegmator for receiving uncondensed vapors, and means for maintaining the oil under a super atmospheric vapor pressure during distillation.

10. An apparatus for cracking hydrocarbon oils, comprising means for preliminarily heating the oil, a plurality of separate serially connected retorts, each adapted to receive bulk supplies of oil, and means for heating each of said retorts, means for introducing the preheated oil to one of the initial stage retorts to pass in succession through the series of retorts to be subjected to cracking temperatures, a substantial portion of said oil being converted to vapor in each retort, dephlegmating means, a communication between one of said retorts and said dephlegmating means whereby the vapors generated in different retorts pass through other retorts and are discharged from one retort into said dephlegmating means to be subjected to their initial reflux treatment, and for returning oil constituents from the dephlegmating means for repassage through the series of retorts for retreatment, a condenser in communication with the dephlegmating means for receiving vapors discharged therefrom, and means for maintaining the oil under a super atmospheric vapor pressure during distillation.

11. An apparatus for cracking hydrocarbon oils, comprising means for preheating the oil, a plurality of separate retorts each adapted to receive bulk supplies of oil and means connecting said retorts in series, means for heating each retort, means for introducing the heated oil to one of the initial stage retorts to pass successively through said retorts, dephlegmating means, means for passing vapors generated in the different retorts from one of said retorts to said dephlegmating means, and for returning oil constituents from the dephlegmating means for repassage through a series of the retorts, a condenser in communication with said dephlegmator for receiving uncondensed vapors, and means for maintaining the oils under super atmospheric vapor pressure during distillation.

12. An apparatus for cracking oil, comprising means for preheating the oil, a plurality of separate retorts serially connected and vertically disposed receiving bulk supplies of oil, means for introducing the heated oil to one of the said retorts to successively pass through subsequent retorts, dephlegmating means, a communication between one of the retorts and the dephlegmating means, means whereby the vapors generated in different retorts are discharged from one retort into said dephlegmating means to be subjected to their initial reflux treatment, and the reflux condensate returned from the dephlegmator for repassage through said retorts for retreatment, and means for maintaining a super atmospheric vapor pressure on the oil undergoing distillation.

13. An apparatus for cracking petroleum oil, the combination with a plurality of retorts adapted to receive oil to accumulate in pools in each retort while passing through the successive retorts, means for heating the oil passing through said retorts to a cracking temperature, means for passing vapors through successive retorts, dephlegmating means, means for discharging vapors from one of said retorts to said dephlegmating means and for returning reflux condensate for repassage through said retorts for retreatment, means for discharging uncondensed vapors from the dephlegmating means for condensation and collection, and means for maintaining a super atmospheric pressure on the oil undergoing distillation.

14. An apparatus for cracking petroleum oil, comprising a plurality of communicating retorts, each receiving bulk supplies of petroleum oil, means for heating the oil in said retorts while maintained under a super atmospheric vapor pressure to generate vapors therefrom, means for passing the vapors generated through successive oil bodies in certain of said retorts, dephlegmating means, means for discharging vapors from one of said retorts to said dephlegmating means and for returning reflux condensate for passage through said retorts.

15. An apparatus for cracking oil, comprising a plurality of communicating retorts adapted to each receive bulk supplies of petroleum oil adapted to pass successively through said retorts, means for heating the oil in each retort while under a super atmospheric vapor pressure, means for passing vapors generated from said oil in certain of said retorts through succeeding pools of oil in the other retorts into a retort constituting a vapor receiving and discharging retort, dephlegmating means, means for discharging vapors from the vapor receiving and discharging retort to said dephlegmating means and for returning reflux condensate for repassage through said retorts.

CARBON P. DUBBS.